UNITED STATES PATENT OFFICE.

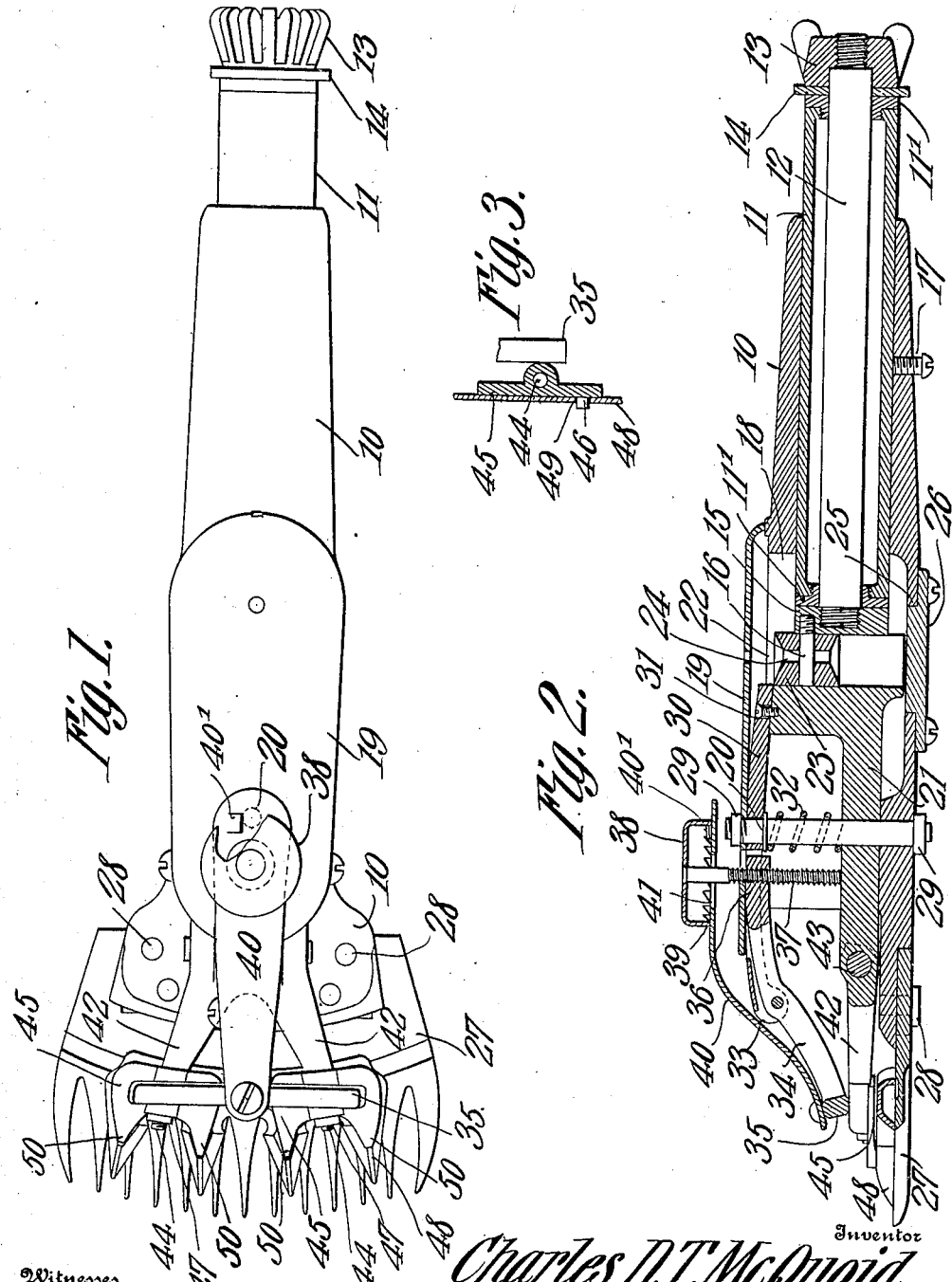

CHARLES D. T. McQUOID, OF TERRY, MONTANA.

SHEEP-CLIPPER.

No. 926,130.　　　Specification of Letters Patent.　　Patented June 29, 1909.

Application filed June 29, 1908. Serial No. 440,898.

*To all whom it may concern:*

Be it known that I, CHARLES D. T. McQUOID, a citizen of the United States, residing at Terry, in the county of Custer and State of Montana, have invented a new and useful Improvement in Sheep-Clippers, of which the following is a specification.

This invention relates to clipping devices and more especially to what are commonly known as sheep clippers, wherein a reciprocating knife is moved across a comb by suitable mechanism.

The principal object of the invention is to improve the general construction of such clippers with a special reference to the means for maintaining the proper degree of contact or tension between the knife and the comb.

The invention consists in general of a mechanically operated sheep clipper provided with an improved form of tensioning device.

The invention further consists of certain novel details of arrangement and combinations of parts hereinafter fully described, illustrated in the accompanying drawings, and specifically set forth in the claims.

In the accompanying drawings, like characters of reference indicate like parts in the several views, and; Figure 1 is a top plan view of a clipper constructed in accordance with this invention. Fig. 2 is a longitudinal median section therethrough. Fig. 3 is a detail of the means whereby the knife is attached to the oscillating lever.

The numeral 10 indicates the body of the device, wherein is held a sleeve 11, carrying centrally supported therein a shaft 12. Upon one end of the shaft 12 is mounted a gear 13 arranged to coact with the gear of a flexible shaft or the like device and be driven thereby. The sleeve 11 is provided at its end with a bearing collar 11' wherein the shaft 12 rotates, and at the end of the sleeve adjacent the gear 13 there is provided an anti-friction washer 14. At the inner or forward end of the sleeve 11 there is carried on the shaft 12 a crank disk 15 provided with a crank pin 16 firmly fixed therein. A set screw 17 serves to hold the sleeve and parts connected therewith in proper position within the body of the casing 10.

The casing or body 10 is cut away as at 18, and over this cut away portion is held a cover 19. Upon the casing 10 near the forward end thereof, is held a pin or shaft 20, forming a pivot for an oscillating lever 21 which is provided at its rear end with a block guideway 22. A block 23, conforming in cross section to the guideway 22 is held to slide in that guideway being mounted on the crank pin 16. This block 23 is preferably provided with a longitudinal perforation therethrough as indicated at 24, the ends whereof are flared as clearly shown in Fig. 2. By this means the crank pin 16 may be reached for the purpose of oiling the same. In order to permit access to the block and crank pin, the casing 10 is provided with an opening 25 normally closed by a cover plate 26 attached to the casing in any desired manner as by screws as shown in Fig. 2.

The lower front portion of the casing 10 is rabbeted and there is held therein a comb 27 of any preferred form secured to the casing by means of screws 28.

The pin or shaft 20 extends upward through the cover 19 and is securely held between the cover and the casing by means of a nut 29. At 30 is shown what is preferably termed a bridge tension bar and this bar is mounted on the oscillating lever 21 by means of a screw 31 passing loosely through a suitable opening in the bar 30, and securely into the lever 21. A spring 32 is held around the pin 20, and is arranged to normally force the bridge tension bar away from the forward end of the oscillating lever 21. At the forward end of the bridge tension bar 30, there is provided a pair of ears 33 between which is mounted a bridge tension bar tightener 34. This bridge tension bar tightener 34 is provided at its forward end with a rigid cross-bar 35 and has further at the inner end a threaded aperture 36. Within the threaded aperture 36 is a tension screw 37, the point of which bears on the lever 21 and the head of which is made cup shaped as at 38 and is provided with a peripheral series of teeth 39 on the edge of the cup shaped portion. Rigidly mounted on the forward end of the tension bar tightener 34, is a tension screw spring 40 provided with an aperture 41 embracing the tension screw 37 so that the rear end of the spring projects beneath the tooth head 38 of the tension screw. This screw and spring are so proportioned that the screw is normally kept from rotation in one direction by the action of the spring in contact with the teeth 39. The screw is free, however, to turn in the opposite direction, and may be freed from the action of the spring by depressing the inner end thereof with the thumb or finger. When this is done the screw is of course free to turn in either direction as may be desired. A fork 42 is mounted upon the forward end of the oscillating lever 21 preferably being pivoted thereto as shown at 43, although it may be rigidly attached thereto in some instances when desired. Journals 44 are formed one on each of the arms of the fork 42 and are screw threaded at the outer ends. Upon the journals 44 are pivotally mounted tension plates 45 each provided with a downwardly projecting pin 46. Nuts 47 serve to hold the tension plates upon the journals 44. The tension plates 45 are held under the arms 35 of the tension bar tightener 34. A clipper knife 48 is held beneath the tension plates 45 and is provided with a suitable aperture 49 at each side thereof wherein the pin 46 fits.

It will now be observed that when the shaft 12 is rotated, the oscillating lever 21 is caused to move backward and forward. This carries with it the fork 42, tension plates 45, they being attached to the fork, and the knife 48. When it is desired to increase the tension between the comb 27 and the knife 48, the tension screw 37 is rotated to the right or in the direction of the hands of a clock. It will cause the inner end of the bar 34 to be lifted and consequently the outer end will be depressed, bringing greater or less tension on the knife and comb as may be deemed necessary for the purpose.

It is to be noted that each of the tension plates 45 is provided with a pair of forwardly extending fingers 50 which are so arranged as each to lie upon one of the blades of the knife, the same being preferably provided with four blades for this purpose. There will thus be maintained an even tension between all parts of the knife and the comb.

It is further to be noted that by reason of the cup shape of the screw head 38, the wool will not catch upon the head during the process of shearing. There is thus obviated one of the great objections to devices of this character wherein the head of the screw projects above the spring and the wool is apt to be caught between the head and the spring and the fibers injured thereby.

It is obvious that many minor changes may be made in the form and proportions of this device without departing from the principles thereof. It is not therefore desired to confine this invention to the exact form herein shown and described, but it is wished to include all such as properly come within the scope of the invention.

Having thus described the invention, what is claimed as new, is:—

1. In a clipper, an oscillating lever, actuating means therefor, a fork pivotally mounted on said lever for movement in a plane transverse the plane of movement of the lever, presser plates pivotally mounted on the fork, a comb, a knife provided with a series of teeth, a connection between said knife and presser plates, fingers on the presser plates each contacting with one of said teeth, and a tension device for said presser plate.

2. In a clipper, an oscillating lever, actuating means therefor, a fork pivotally mounted thereon, presser plates pivoted on the fork, a comb, a knife provided with a series of teeth, connecting means between said presser plates and knife, fingers on the presser plates each contacting with one of said teeth, a bridge tension bar loosely mounted on said oscillating lever, a tension bar tightener pivoted to said bridge tension bar and provided with a threaded aperture in one end thereof, and a cross-bar in the other end bearing on said presser plates, a tension screw passing through said threaded aperture and provided with a cup shaped head having peripheral ratchet teeth, and a tension screw spring rigidly mounted on the tension bar tightener and fingers on the presser plates each contacting with said teeth.

3. In a clipper, an oscillatory lever, actuating means therefor, a fork carried thereon, presser plates mounted on the fork, one on each arm thereof, a comb, a knife provided with a series of teeth, connecting means between the knife and the presser plates, fingers on the presser plates contacting with said teeth, a bridge tension bar tightener, an adjusting screw therefor, and a tension spring fixed upon the tightener and engaging with said adjusting screw.

In testimony that I claim the foregoing as my own, I have hereto affixed my signature in the presence of two witnesses.

CHARLES D. T. McQUOID.

Witnesses:
GEO. T. GIPSON,
RAY L. RAMPF.